United States Patent
Kalbitz et al.

(10) Patent No.: US 7,005,004 B2
(45) Date of Patent: Feb. 28, 2006

(54) AQUEOUS, COLLOIDAL GAS BLACK SUSPENSION

(75) Inventors: Werner Kalbitz, Rodenbach (DE); Gerd Tauber, Seligenstadt (DE); Heinz Zoch, Maintal (DE); Stephan Lüdtke, Maintal (DE); Thomas Lüthge, Hanau (DE); Ralph Mcintosh, Hanau (DE)

(73) Assignee: Degussa AG, Düsseldorf (DE)

( * ) Notice: Subject to any disclaimer, the term of this patent is extended or adjusted under 35 U.S.C. 154(b) by 0 days.

(21) Appl. No.: 10/812,835

(22) Filed: Mar. 30, 2004

(65) Prior Publication Data

US 2005/0178291 A1 Aug. 18, 2005

(30) Foreign Application Priority Data

Feb. 18, 2004 (DE) ............ 10 2004 007 780

(51) Int. Cl.
C09C 1/48 (2006.01)
C09C 1/56 (2006.01)
C09D 11/00 (2006.01)

(52) U.S. Cl. .............. 106/31.81; 106/31.52; 106/476; 524/190; 524/192

(58) Field of Classification Search ........... 106/476, 106/31.81, 31.52; 524/190, 192
See application file for complete search history.

(56) References Cited

U.S. PATENT DOCUMENTS

| 3,687,887 | A | | 8/1972 | Zabiak | |
|---|---|---|---|---|---|
| 5,085,698 | A | * | 2/1992 | Ma et al. | 524/388 |
| 5,320,668 | A | * | 6/1994 | Shields et al. | 106/31.28 |
| 5,538,548 | A | * | 7/1996 | Yamazaki | 524/386 |
| 5,609,671 | A | * | 3/1997 | Nagasawa | 106/31.65 |
| 6,251,174 | B1 | | 6/2001 | Lavery et al. | |
| 2004/0087707 | A1 | * | 5/2004 | Zoch et al. | 524/495 |

FOREIGN PATENT DOCUMENTS

| DE | 21 36 055 | | 1/1972 |
|---|---|---|---|
| DE | 198 55 014 A1 | | 5/2000 |
| DE | 695 15 129 T2 | | 9/2000 |
| DE | 10235027 A1 | * | 2/2004 |
| EP | 724968 A | * | 8/1996 |
| EP | 1002839 A | * | 5/2000 |
| EP | 1 215 250 A1 | | 6/2002 |
| JP | 11-217529 A | * | 8/1989 |
| JP | 4-57865 A | * | 2/1992 |
| JP | 11-323229 | | 11/1999 |
| WO | WO 96/18694 | | 6/1996 |
| WO | WO 2004/046256 A1 | | 6/2004 |

OTHER PUBLICATIONS

Chemical Abstract Registry No. 1333-86-4, Mogul L (no date).*
Chemical Abstract Registry No. 85631-88-5, Direct Black 168 (no date).*
Chemical Abstract Registry No. 2118-39-0, Food Black 2 (no date).*
"Gas Black", IUPAC Compendium of Chemical Terminology, 2$^{nd}$ Edition (1997) no month.*
"Furnace Black", IUPAC Compendium of Chemical Terminology, 2$^{nd}$ Edition (1997) no month.*
Technical Bulletin Pigments: Properties of pigment blacks and methods for their characterization, No. 14, published by Degussa-Huls AG (no date).*
Publication by Degussa-Huls AG entitled: What is Carbon Black? (no date).*

* cited by examiner

*Primary Examiner*—Anthony J. Green
(74) *Attorney, Agent, or Firm*—Smith, Gambrell & Russell, LLP (57) ABSTRACT

Aqueous, colloidal gas black suspension, containing a gas black, an azo compound of formula 1,

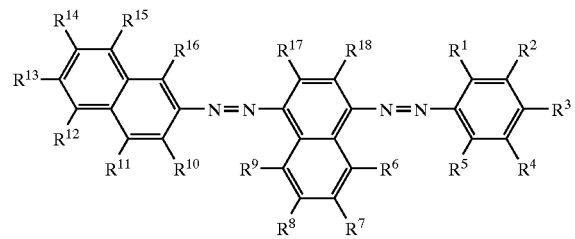

(1)

and water.

The aqueous, colloidal gas black suspensions is produced in that the gas black and the azo compound of general formula 1 are dispersed in water.

It may be used to produce inks, ink jet inks, paints, printing inks, latices, textiles, leather, adhesives, silicones, plastics materials, concrete and construction materials.

20 Claims, 3 Drawing Sheets

Light microscopic photograph of the reference suspension 3

Light microscopic photograph of the colloidal, aqueous gas black suspension 1 according to the invention.

Fig. 1

Light microscopic photograph of the
ink 2 according to the invention

Light microscopic photograph of the
ink 3 according to the invention

Fig. 2

Light microscopic photograph of the
Reference ink 1

Fig. 3

AQUEOUS, COLLOIDAL GAS BLACK SUSPENSION

INTRODUCTION AND BACKGROUND

The invention relates to an aqueous, colloidal gas black suspension, to a process for its production and to its use.

It is known to use aqueous, colloidal carbon black suspensions to produce paints, printing inks or else directly as inks, for example in ink jet printers (U.S. Pat. No. 5,085,698, U.S. Pat. No. 5,320,668).

It is also known to produce carbon black suspensions using dyes which also act as wetting agents without the addition of further wetting agents (U.S. Pat. No. 6,503,317) (PCT/US99/11935).

It is also known to produce aqueous carbon black suspensions using water-soluble wetting agents, for example acrylic resins (U.S. Pat. No. 5,609,671) or ethoxylates (DE 19824947 A1).

EP 1215250 discloses ink jet inks which contain a solvent, a pigment and also a dye which is soluble in the solvent, of which the absorption peak is in the wavelength range of 500 nm to 700 nm.

Drawbacks of the known wetting agent-stabilised carbon black suspensions are, when using non-ionogenic surfactants, the excessively high zeta potential and the low surface tension and, when using anionic surfactants, excessive wetting of the paper owing to the pronounced interactions with the likewise anionic paper coating, and these lead to low optical printing densities.

Further drawbacks of the known dye-stabilised carbon black suspensions are the inadequate stability in storage and freeze-thaw stability. With relatively long service lives of the dispersions or at storage temperatures of more than 50° C. or less than 0° C., this leads to a marked and irreversible increase in the viscosity, to reagglomeration of the suspended pigment particles or to complete flocculation of the suspension. Ink jet prints with known dye-stabilised carbon black dispersions also exhibit insufficient water resistance, and this is a significant drawback in terms of application technology. When using furnace carbon blacks a relatively low optical density is also seen.

DESCRIPTION OF INVENTION

The object of the present invention is to provide an aqueous gas black suspension having high optical density on substrates, such as paper, a low zeta potential, a high surface tension, a low viscosity, good stability in storage and excellent water resistance in the ink jet print.

The invention relates to an aqueous, colloidal gas black suspension, which is characterised in that it contains a gas black, an azo compound of general formula 1, (1)

wherein $R^1$–$R^{18}$ may be identical or different and consist of hydrogen, hydrophilic or hydrophobic groups, acceptor or donor substituents or portions of aliphatic, aromatic or heteroaromatic, acyclic, cyclic or multiply cyclic systems with acceptor, donor, hydrophilic or hydrophobic groups, and water.

Colloidal means the uniform distribution of particles with a diameter of 10 nm to 10 μm in a suspending medium.

Depending on the printing process, a low viscosity may be advantageous for use in inks, to obtain the desired printing properties, for example print quality. A low zeta potential, which describes the charge state of the particles in the carbon black suspension, is a measured variable for good stability of the suspension. High surface tension, for example in ink jet processes, positively influences droplet formation. A high degree of dispersion is of fundamental importance for good stability in storage, for good colour properties in use and for preventing nozzle blockages, especially in ink jet processes. Good water resistance of the print is also particularly advantageous, as external applications are becoming increasingly important in ink jet processes.

The gas black may have a volatile matter content (950° C.) of <21% by weight, preferably <6% by weight. The gas black may have a BET surface area of 80 to 350 m$^2$/g. The gas black may have a primary particle size of 8 to 40 nm, preferably of 13 to 30 nm, particularly preferably of 13 to 20 nm. The gas black may have a DBP number of 40 to 200 ml/100 g.

The gas black may also be a mixture of different gas blacks.

By way of example, Farbruβ FW 200, Farbruβ FW 2, Farbruβ FW 2 V, Farbruβ FW 1, Farbruβ FW 18, Farbruβ S 170, Farbruβ S 160, Spezialschwarz 6, Spezialschwarz 5, Spezialschwarz 4, Spezialschwarz 4A, NIPex 150, NIPex 160 IQ, NIPex 170 IQ, NIPex 180 IQ, Printex U, Printex V, Printex 140 U or Printex 140 V from Degussa AG may be used as carbon blacks.

The gas black content of the aqueous, colloidal gas black suspension according to the invention may be less than 30% by weight, preferably less than 20% by weight.

The azo compound of general formula 1 may contain the general formula 1 singly or multiply in the azo compound.

The hydrophilic or hydrophobic groups of the substituents $R^1$–$R^{18}$ may be OH, —SO$_3$R$^{19}$, COOR$^{19}$, alkyl, aryl or completely or partially halogenated halogen alkyl or halogen aryl groups, such as completely or partially fluorinated alkyl or aryl groups, where $R^{19}$=H, metal cation, ammonium, alkyl, aryl or functionalised alkyl or aryl, such as ω-carboxyalkyl, HSO$_3$—C$_x$H$_y$—, H$_2$N—C$_x$H$_y$— or H$_2$N—SO$_2$—C$_x$H$_y$— (x=1–20; y=1–45).

The acceptor or donor substituents of the substituents $R^1$–$R^{18}$ may be COOR$^{19}$, —CO—R$^{19}$, —CN, —SO$_2$R$^{19}$ or —SO$_2$OR$^{19}$, alkyl, aryl groups, OR$^{20}$, N(R$^{20}$)$_2$, SR$^{20}$ or P(R$^{20}$)$_2$, where $R^{20}$=H, alkyl, aryl or functionalised alkyl or aryl, oligomers or polymers of the form —(O—R$^{20}$)$_y$—OR$^{21}$, where $R^{21}$=H, alkyl or aryl.

The unsubstituted or substituted aliphatic or aromatic substituents of the substituents $R^1$–$R^{18}$ may be phenyl, naphthyl or heteroaromatic substituents, such as pyrrolyl, pyridinyl, furyl or puryl.

The following may, for example, be used as the azo compound of general formula 1.

-continued

R²² = H, SO₃Na

-continued

The following may, for example, be used as the azo compound of general formula 1:

Tetrasodium-6-amino-4-hydroxy-3-[[7-sulphonato-4-[(4-sulphonatophenyl)azo]-1-naphth-1-yl]azo]naphthalene-2,7-disulphonate, 5-[4-(4-(7-[[2-ethoxy-4-(4-methyl-2-sulpho-phenylazo)-6-sulfo-naphthalen -1-yl]azo]-8-hydroxy-3,6-disulpho-naphthalen-1-ylamino) -6-phenylsulphanyl-[1,3,5]triazin-2-ylamino]-phenylazo]-2-hydroxy-benzoic acid or the salts thereof with alkali metal cations or ammonium ions as the counter ion or
2-[[4-[(1-hydroxy-6-phenylamino-3-sulpho-naphthalen-2-yl)azo]-6-sulpho-naphthalen-1-yl]azo]-5-methyl-benzene-1,4-disulphonic acid or the salts thereof with alkali metal cations or ammonium ions as the counter ion The content of azo compound of general formula 1 in the aqueous, colloidal gas black suspension according to the invention may be less than 5% by weight, preferably less than 3% by weight, particularly preferably less than 1% by weight, quite particularly preferably between 0.1 and 1% by weight.

The azo compound of general formula 1 may contain less than 30% by weight, preferably less than 20% by weight contamination.

The azo compound of general formula 1 may contain less than 10% by weight, preferably less than 5% by weight, particularly preferably less than 2500 ppm, salt. The azo compound of general formula 1 may contain at least 100 ppm salt.

The azo compounds 2-[[4-[(1-hydroxy-6-phenylamino-3-sulpho-naphthalen-2-yl)azo]-6-sulpho-naphthalen-1-yl]azo]-5-methyl-benzene-1,4-disulphonic acid, 5-[4-(4-(7-[[2-ethoxy-4-(4-methyl-2-sulpho-phenylazo)-6-sulpho-naphthalen-1-yl]azo]-8-hydroxy-3,6-disulpho-naphthalen-1-ylamino]-6-phenylsulphanyl-[1,3,5]triazin-2-ylamino]-phenylazo]-2-hydroxy-benzoic acid or tetrasodium-6-amino-4-hydroxy-3-[[7-sulphonato-4-[(4-sulphanatophenyl)azo]-1-naphth-1-yl]azo]naphthalene-2,7-disulphonate, may contain less than 10% by weight, preferably less than 5% by weight, salt.

In a preferred embodiment the aqueous, colloidal gas black suspension according to the invention may be free from wetting agent, the content of the azo compound of general formula may be between 0.1 and 1% by weight and the salt content of the aqueous, colloidal gas black suspension according to the invention may be less than 2500 ppm, preferably between 100 and 2500 ppm.

The aqueous, colloidal gas black suspension according to the invention may contain biocides, wetting agents and/or additives.

The aqueous, colloidal gas black suspension according to the invention may contain a biocide. The biocide may be added in quantities of 0.01 to 1.0% by weight. Isothiazolinone derivatives, formaldehyde eliminators or combination products of the two product categories may be used as the biocide. For example, Parmetol from Schülke & Mayr, Ebotec from Bode Chemie, Acticide from Thor Chemie or Proxel from Zeneca may be used as the biocide.

The aqueous, colloidal gas black suspension according to the invention may be free from wetting agent. Wetting agent may also be added in quantities of 0 to 1% by weight, preferably 0.4 to 0.6% by weight, relative to the total suspension. Categories of compound, such as fatty alcohol ethoxylates, polyacrylic acid or/and derivatives thereof, copolymers containing acrylic acid, acrylic acid derivatives, styrenes, styrene derivatives and/or polyethers, lignin sulphonates, alkyl benzene sulphonates, naphthalene sulphonic acid derivatives, copolymers containing maleic acid anhydride and/or maleic acid derivatives or combinations of said wetting agents may be used as wetting agents. The copolymers may be random or alternating block or graft copolymers. For example, Joncryl 678, Joncryl 680, Joncryl 682 or Joncryl 690 from Johnson Polymer B.V. may be used as the dispersion-assisting wetting agent.

Ammonium hydroxide- or alkali hydroxide-neutralised forms, in particular NaOH-neutralised forms of the styrene acrylic acid copolymers may preferably be used as the dispersion-assisting wetting agent.

Other types of wetting agent may also be used to produce the aqueous, colloidal gas black suspension according to the invention.

Additives, such as alcohols or glycols, for example 1,5-pentane diol, glycol ethers such as dipropylene glycol, heterocycles such as 2-pyrrolidone or glycerol may also be added to the aqueous, colloidal gas black suspension according to the invention.

The content of additives in the aqueous, colloidal gas black suspension according to the invention may be less than 30% by weight, preferably less than 15% by weight.

The invention also relates to a process for producing the aqueous, colloidal gas black suspension according to the invention, which is characterised in that the gas black and the azo compound of general formula 1 are dispersed in water.

Dispersion may be carried out using bead mills, ultrasound equipment, high-pressure homogenisers, microfluidisers, Ultra Turrax or comparable units. Following dispersion the aqueous, colloidal gas black suspension may be purified by centrifuging and/or filtering.

The invention also relates to the use of the aqueous, colloidal gas black suspension according to the invention in inks, ink jet inks, paints, printing inks, latices, textiles, leather, adhesives, silicones, plastics materials, concrete and construction materials.

The aqueous, colloidal gas black-suspensions according to the invention may be used for dyeing, anti-static finishing, reinforcing and for UV protection of materials.

The invention also relates to an ink which is characterised in that it contains the aqueous, colloidal gas black suspension according to the invention.

The ink according to the invention may contain between 0.01 and 0.5% by weight, preferably between 0.05 and 0.3% by weight of azo compounds of general formula 1.

The ink according to the invention may contain less than 0.05% by weight, preferably less than 0.025% by weight salt. The ink according to the invention may contain at least 10 ppm salt.

In a preferred embodiment the ink according to the invention may be free from wetting agent, the azo compound content of general formula 1 may be between 0.01 and 0.5% by weight and the salt content of the ink according to the invention may be less than 250 ppm, preferably between 10 and 250 ppm.

The advantages of the aqueous, colloidal gas black suspensions according to the invention are the high optical densities, the low zeta potential, the high surface tension, the good stability in storage, the high degree of dispersion and the good water resistance of the dried prints.

BRIEF DESCRIPTION OF DRAWINGS

The present invention will be further understood with reference to the accompanying drawings, wherein.

DETAILED EMBODIMENTS OF THE INVENTION

EXAMPLES

Example 1

Production of the Carbon Black Suspensions

1. Preparation of the Suspension

All components apart from carbon black are introduced into a container and homogenised while stirring.

The carbon black is gradually incorporated into the solution while stirring slowly (either manually or using a slow agitator).

2. Dispersion

The suspension prepared under point 1 is dispersed using the ultrasound equipment. Very coarse particles may be separated in the centrifuge from the suspension thus obtained.

Table 1 shows the compositions and properties of reference suspensions and of the aqueous, colloidal gas black suspension 1 according to the invention.

TABLE 1

|  |  | Reference suspension 1 | Reference suspension 2 | Reference suspension 3 | Aqueous, colloidal gas black suspension according to the invention 1 |
|---|---|---|---|---|---|
| NIPex 160 IQ | % | — | — | — | 15 |
| Spezialschwarz 550 | % | 15 | 15 | 15 | — |
| Azo compound of general formula 1 | % | 0.7 | 1.0 | 3.0 | 0.7 |
| Acticide MBS | % | 0.3 | 0.3 | 0.3 | 0.3 |
| Deionised water | % | 84.0 | 83.7 | 81.7 | 84.0 |
| Suspension consistency |  | liquid | liquid | liquid | Liquid |
| Degree of dispersion By light microscopy |  | poor | poor | poor | Very good |
| Stability in storage 50° C. over 28 days |  | sediment | sediment | sediment | Very good |
| Optical density ink jet ink 6 μm draw downs on Data Copy paper |  | n.a. | n.a. | n.a. | 1.5 | n.a. = not applicable

Spezialschwarz 550 is an oxidised furnace carbon black from Degussa AG with a primary particle size of 25 nm.

NIPex 160 IQ is a gas black from Degussa with a primary particle size of 20 nm.

Acticide MBS is a biocide from Thor Chemie.

Tetrasodium-6-amino-4-hydroxy-3-[[7-sulphonato-4-[(4-sulphanatophenyl)azo]-1-naphth-1-yl]azo]naphthalene-2,7-disulphonate with the formula from Bayer is used as the azo compound of formula 1. This azo compound has a salt content of 312 ppm.

Determining the Salt Content

The salt content of the azo compound is the sum of sodium sulphate measured by the sulphate concentration and converted to sodium sulphate, and sodium chloride, measured by the chloride concentration and converted to sodium chloride.

Determining the Sulphate Concentration

Basis of the Process

A low capacity ion exchanger is used as the separation column.

The ions were eluted by electrolytes. A conductivity detector was used for detection.

Chemicals

Ultrapure water (conductivity <0.1 $\mu$S/cm)
Sulphate stock solution w($SO_4$)=1000 mg/l
Eluent $Na_2CO_3$/$NaHCO_3$ (2.2/2.8 mmol/l)

Equipment

Tumbler
Ion chromatograph with conductivity detector
Low capacity ion exchanger

Principle

The samples were eluted in the tumbler at ambient temperature for 1 hour with ultrapure water and sulphate determined by ion chromatography in the eluate.

Implementation

About 200 mg sample were weighed into a closable test tube and eluted in the tumbler at ambient temperature for 1 hour with ultrapure water.

The suspension was then transferred to a measuring flask and filled up to the mark with ultrapure water. The measuring flask should be selected such that the sample solution contains 0.5 to 40 mg/l $SO_4^{2-}$.

The sample solution was injected via a 0.2 $\mu$m injection filter into the ion chromatograph. The sulphate concentration was calculated using the measured peak area.

Calculation $$w(SO_4^{2-})[\%] = \frac{\beta \cdot V \cdot 100}{m}$$

$\beta$=Concentration of the sample solution in mg/l
V=volume of sample solution in l
m=weighed portion in mg
100=conversion factor in %

$$w(Na_2SO_4)[\%] = \frac{w(SO_4^{2-}) \cdot mol(Na_2SO_4)}{mol(SO_4^{2-})}$$

mol ($SO_4^{2-}$) molecular weight $SO_4^{2-}$
mol ($Na_2SO_4$) molecular weight $Na_2SO_4$ Determining the Chloride Concentration Basis of the Process To determine the chloride content, the sample was suspended using ultrapure water.

The chloride concentration was determined by argentometric titration.

Chemicals

Ultrapure water (conductivity <0.1 $\mu$S/cm)
Chloride stock solution, c($Cl^-$)=0.1000±0.0005 mol/l
Silver nitrate solution, c($AgNO_3$)=0.1 mol mol/l and 0.01 mol/l
Nitric acid w($HNO_3$)=30%

Equipment

Titroprocessor 670 (Metrohm)
Silver rod electrode
Reference electrode (Hg/$HgSO_4$)

Principle

After formation of a slurry, the suspension was acidified and titrated with silver nitrate.

Implementation

About 1 to 3 g of the sample were weighed to exactly 1 mg into a beaker.

After addition of about 80 ml ultrapure water, the mixture was stirred and the material adhering to the glass wall above the liquid level was rinsed down with water.

After 5 min, the sample was acidified using nitric acid, the electrodes and the burette tip were immersed in the suspension and potentiometrically titrated.

Calculation

The percentage mass fraction w of chloride was calculated to $$w(Cl^-)\% = \frac{V_{Ag} \times c \times M \times 100 \times t}{m}$$

$V_{Ag}$ volume of the silver nitrate solution consumed during titration in ml
c molarity of the silver nitrate solution [mol/l]
M atomic mass of chloride
t titre of the silver nitrate solution $$w(NaCl)[\%] = \frac{w(Cl^-) \cdot mol(NaCl)}{M}$$

mol(NaCl) molecular weight NaCl

The aqueous, colloidal gas black suspension 1 according to the invention is of low viscosity and has a high optical density, good stability in storage, a high degree of dispersion and excellent water resistance of the dried print.

Figure 1:
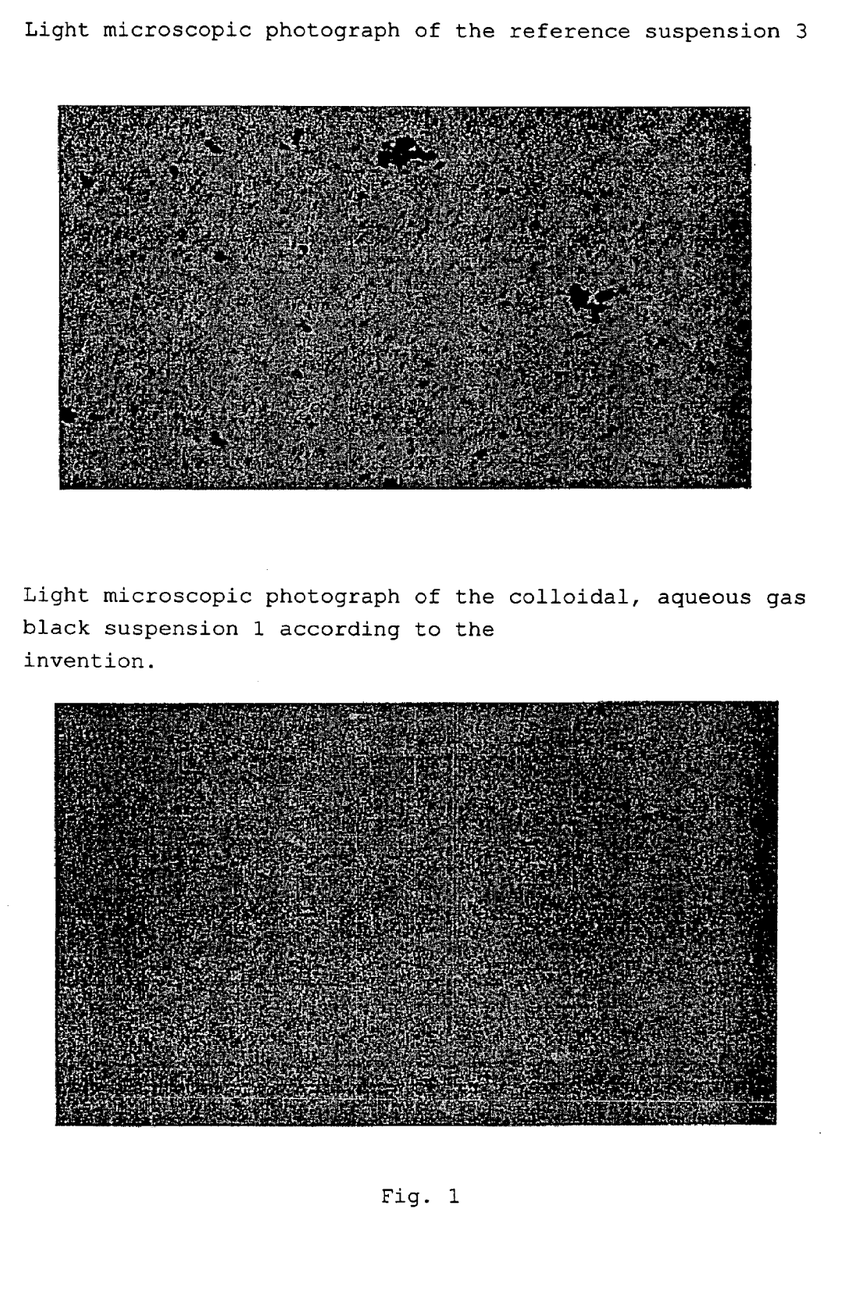
FIG. 1A shows a light microscopic photograph of reference suspension 3.
FIG. 1B shows a light microscopic photograph of the colloidal, aqueous gas black suspension according to the invention.

FIG. 1 shows light microscopic photographs of the reference suspension 3 and of the aqueous, colloidal gas black suspension 1 according to the invention. The reference suspensions 1 to 3 have a large coarse fraction and are partially flocculated and sedimented and therefore do not meet the requirements of an ink jet ink. By contrast, the gas black suspension 1 according to the invention does not have a coarse fraction and has outstanding stability in storage (no sediment).

Example 2

Table 2 shows the dependence of aqueous, colloidal gas black suspensions 1 to 4 according to the invention on the salt content.

TABLE 2

|  |  | Aqueous, colloidal gas black suspension according to the invention 2 | Aqueous, colloidal gas black suspension according to the invention 3 | Aqueous, colloidal gas black suspension according to the invention 4 | Aqueous, colloidal gas black suspension according to the invention 1 |
| --- | --- | --- | --- | --- | --- |
| NIPex 160 IQ | % | 15 | 15 | 15 | 15 |
| Azo compound of general formula 1 | % | 0.7 | 0.7 | 0.7 | 0.7 |
| Acticide MBS | % | 0.3 | 0.3 | 0.3 | 0.3 |
| Deionised water | % | 84.0 | 84.0 | 84.0 | 84.0 |
| Salt content | ppm | 2500 | 5000 | 10000 | <20 |
| Suspension consistency after production |  | liquid | viscous | gelled, pasty | liquid |
| Viscosity after production [mPas] |  | <10 | >100 | n.a. | <10 |
| Stability in storage 28 days at 50° C. |  | viscous | gelled, pasty | n.a. | liquid |

The aqueous, colloidal gas black suspensions 1 to 4 according to the invention show that even a slight increase in the salt content causes a marked increase in viscosity, so, with regard to metering capacity, pumping capacity and long-term stability, they have insufficient properties to be used, for example, in ink jet processes. The aqueous, colloidal gas black suspension 1 according to the invention is thin and may therefore be easily metered and pumped. Owing to the excellent stability in storage even when stored in heat over 28 days, the gas black suspension 1 according to the invention has the best properties for use, for example in the ink jet process.

Example 3

Table 3 shows the properties of reference suspensions with addition of anionic (reference suspension 4) and non-ionic (reference suspension 5) wetting agent in comparison with the aqueous, colloidal gas black suspension 1 according to the invention.

TABLE 3

|  |  | Reference suspension 4 | Reference suspension 5 | Aqueous, colloidal gas black suspension according to the invention 1 |
| --- | --- | --- | --- | --- |
| NIPex 160 IQ | % | 15 | 15 | 15 |
| Disponil FES 32 IS | % | 6 | — | — |
| Hydropalat 3065 | % | — | 5 | — |
| Azo compound of general formula 1 | % | — | — | 0.7 |
| AMP 90 | % | 0.2 | 0.2 | — |
| Acticide MBS | % | 0.3 | 0.3 | 0.3 |
| Deionised water | % | 78.5 | 79.5 | 84.0 |
| Zeta potential | mV | −15 | −4 | −56 |
| Surface tension | mN/m | 38 | 44 | 72 |

TABLE 3-continued

|  |  | Reference suspension 4 | Reference suspension 5 | Aqueous, colloidal gas black suspension according to the invention 1 |
| --- | --- | --- | --- | --- |
| Optical density (6 μm draw downs on Data Copy Paper) |  | 1.2 | 0.9 | 1.5 |

Disponil FES 32 IS is an anionic wetting agent (fatty alcohol polyglycol ether sulphate) from Cognis.

Hydropalat 3065 is a non-ionic wetting agent (mixture of ethoxylated linear fatty alcohols) from Cognis. AMP 90 is a 2-amino-2-methyl-1-propanol from Angus Chemie. The azo compound of general formula 1 is tetrasodium-6-amino-4-hydroxy-3-[[7-sulphonato-4-[(4-sulphanatophenyl)azo]-1-naphth-1-yl]azo]naphthalene-2,7-disulphonate from Bayer.

In comparison with the aqueous, colloidal gas black suspension 1 according to the invention, the reference suspensions 4 and 5 stabilised with wetting agent have an excessive zeta potential and a low surface tension when using non-ionogenic surfactants (5), whereas excessive wetting of the paper and therefore an inadequate optical density is observed when using anionic surfactants (4), owing to the pronounced interactions with the likewise anionic paper coatings (Table 3).

Example 4

Table 4 shows the properties of a dye-containing reference suspension (6) in comparison with the aqueous, colloidal gas black suspension 5 according to the invention.

TABLE 4

|  |  | Reference suspension 6 | Aqueous, colloidal gas black suspension 5 according to the invention |
| --- | --- | --- | --- |
| NIPex 160 IQ | % | 15 | 15 |
| Azo compound of general formula 1 | % | — | 0.7 |
| Acid Black 1 | % | 1.2 | — |
| Acticide MBS | % | 0.3 | 0.3 |
| IDIS @ solv.pd | % | 8 | 8 |
| Distilled water | % | 75.5 | 76.0 |
| Light microscope |  | 1 | 1 |
| Freeze-thaw stable |  | yes | Yes |
| pH |  | 7.6 | 7.4 |
| Mean particle size | Nm | <100 | <100 |
| Viscosity RT | mPas | 4.5 | 4.3 |
| Surface tension | mN/m | 68 | 68 |
| Zeta potential | mV | −51 | −56 |
| Stability in storage 50° C./7 days | mPas | <10* | <10* |
| Stability in storage 50° C./14 days | mPas | <10* | <10* |
| Stability in storage 50° C./28 days | mPas | <10* | <10* |
| Water resistance |  | poor | Very good |

*= no sediment, no reagglomeration

IDIS @ solv.pd is 1,3-propanediol from Degussa AG. Acid Black 1 is Naphthol Blue Black with a salt content of 1.5% by weight from Aldrich Chemical Company. The azo compound of general formula 1 is tetrasodium-6-amino-4-hydroxy-3-[[7-sulphonato-4-[(4-sulphanatophenyl)azo]-1-naphth-1-yl]azo]naphthalene-2,7-disulphonate from Bayer.

Light microscopic investigation of the degree of dispersion: The degree of dispersion was evaluated with 400× magnification. With this setting, coarse particles >1 μm may be easily detected using the scale on the light microscope.

Rating:
Grade 1: very good; no coarse fractions >1 μm,
Grade 2: satisfactory; very few coarse fractions >1 μm,
Grade 3: poor; large number of coarse particles >1 μm.

Determining the Viscosity:

The Theological behaviour was detected in a rotation experiment with a critical shear rate (CSR) using a Physica Rheometer UDS 200. The viscosity value was read off at a shear rate of 1000 s$^{-1}$.

Determining the Mean Particle Size:

The particle size distribution was determined using a photon correlation spectrometer (PCS), Horiba LB-500 type, and the "median value" shown read off as the mean particle size. Measurement was carried out on an undiluted sample of suspension.

Determining the Surface Tension:

The dynamic surface tension was determined using the Blasentensiometer BP2 from Krüss. The end value was read off at 3,000 ms.

Stability in Storage Test at 50° C. Over 28 Days:

The samples were stored at 50° C. for 28 days. The viscosity and sedimentation tendency were investigated.

Each 300 ml of suspension sample were stored in the drying cabinet for 28 days at 50 ° C. in a closed glass bottle. The formation of sediment on the base was investigated using a spatula and the viscosity measured using a Brookfield Viscosimeter DV II plus. In addition, the formation of sediment on some samples was investigated during storage at ambient temperature.

Freeze-Thaw Stability Test:

The samples were frozen at −25° C. and, after thawing, the degree of dispersion was investigated using a light microscope.

A sample is judged to be freeze-thaw stable if, after thawing, the previously frozen sample has a thin consistency again, does not form a sediment and no reagglomerations are visible under the light microscope.

Determining the pH:

The pH of the undiluted suspension was determined using the pH-Meter CG 837 from Schott. For this purpose, the glass electrode was immersed in the solution and the temperature-corrected pH was read off after 5 minutes.

Determining the Zeta Potential:

The zeta potential was determined using a MBS-8000 from Matec. The samples were measured undiluted. The zeta potential was determined by means of electrokinetic sound amplitude (ESA).

Water Resistance:

To assess the water resistance, inks with a 4.5% carbon black content were produced from the suspensions with the following formulation:
30.0% gas black suspension
12.0% 2-pyrrolidone
3.0% Liponic EG 07
1.2% IDID @ solv.hd
4.0% IDIS @ solv.pd
49.8% deion. water Print demos were produced on copier paper using an ink jet office printer HP Deskjet 6122 and dried for 24 hours at ambient temperature. The print demos were submerged in a photographic tray in distilled water and soaked for 5 min.

After the soaking period, the prints were removed from the water bath and dried for 24 hours at ambient temperature.

The water resistance was evaluated by visual assessment of the discolouration of the copier paper.

Rating:
Very good=no discoloration of the paper
Poor=discoloration of the paper

The aqueous, colloidal gas black suspension 5 according to the invention has improved water resistance compared to the reference suspension 6. The aqueous, colloidal gas black suspension 5 according to the invention meets all the requirements of an optimal suspension.

Example 5

Inks with a 4.5% carbon black content were produced from the gas black suspension 5 according to the invention using 2-pyrrolidone, 1,2-hexanediol, 1,3 propanediol, ethoxylated glycerol, dimethylaminoethanol and deionised water. For this purpose, the premix was presented to ink additives and the carbon black suspension carefully added while stirring. The finished ink was filtered at a filtering fineness of 500 Nm. 6 μm draw downs were then produced on copier paper (Kompass Copy Office type) using the K Control Coater and the optical density was determined after 24 hours using a densitometer.

The print tests were carried out using a Canon Office BJC-S750 printer. For this purpose, the ink was deaerated in advance under vacuum and poured into a cleaned original printer cartridge.

The following print tests were carried out:
a. Print one side of copier paper and various conventional commercial ink jet papers to determine the optical density and for visual assessment of the print quality.
b. Refire tests after 1, 3, and 7 days' pause in printing to assess the write-on and dry-on behaviour of the ink.

Table 5 compiles the print results.

The inks according to the invention are distinguished by very good printability, high optical densities and very good stability in storage.

TABLE 5

| | |
|---|---|
| Ink according to the invention | 1 |
| Carbon black concentration [%] | 4.5 |
| Ink formulation [%] | |
| Aqueous, colloidal gas black suspension 5 according to the invention | 30.0 |
| 2-pyrrolidone | 12.0 |
| Liponic EG-07 (ethoxylated glycerol) | 1.5 |
| IDIS@solv.pd (1,3 propanediol) | 1.5 |
| IDIS@solv.hd (1,2 hexanediol) | 1.5 |
| Deionised water | 53.48 |
| Dimethylaminoethanol | 0.02 |
| Light microscope | 1 |
| PH | 8.8 |
| Viscosity [mPas] | 2.7 |
| Surface tension [mN/m] | 47 |
| Office printer used | Canon BJC S750 |
| Optical density (OD) on Kompass Copy Office | 1.51 |
| OD on InkJet paper HP 51634 Z | 1.58 |
| OD on InkJet paper CANON HR-101 | 1.60 |
| OD on InkJet paper EPSON 720 dpi | 1.62 |
| Overall visual impression of printed image* | 1 |
| Nozzle blockages | none |
| Encrustations on the print head | none |

TABLE 5-continued

| | |
|---|---|
| Proof after printing pause of 60 min ** | + |
| Proof after printing pause of 1 day | + |
| Proof after printing pause of 3 days | + |
| Proof after printing pause of 7 days | + |

Note:
*1 = very good; 2 = satisfactory; 3 = poor
** + = no write-on problems; − = write-on problems Example 6

Table 6 shows the compositions and properties of a reference ink and of the inks according to the invention.

TABLE 6

| | Ink sample | | |
|---|---|---|---|
| | Ink according to the invention | Ink according to the invention | Reference ink |
| No. | 2 | 3 | 1 |
| Aqueous colloidal gas black suspension 1 [%] according to the invention | 13.30 | 13.30 | — |
| Reference suspension 1 [%] | — | — | 13.30 |
| Azo compound of general formula 1 | — | 4.91 | 4.91 |
| Ethanol [%] | 5.00 | 5.00 | 5.00 |
| Ethyleneglycol [%] | 20.00 | 20.00 | 20.00 |
| 1,2-hexanediol [%] | 5.00 | 5.00 | 5.00 |
| Deionised water [%] | 56.70 | 51.79 | 51.79 |
| Suspension consistency | liquid | liquid | liquid |
| Optical density on copy paper * | 1.51 | 1.45 | 1.26 |
| Microscope (degree of dispersion) | ++ | — | — |

* = 6 μm ink draw down on Data Copy copier paper
++ very good,
o satisfactory,
— poor The same azo compound was used as the azo compound of general formula 1 as in the aqueous, colloidal gas black suspension 1 according to the invention (tetrasodium-6-amino-4-hydroxy-3-[[7-sulphonato-4-[(4-sulphonatophenyl)azo]-1-naphth-1-yl]azo]naphthalene-2,7-disulphonate.

An ink according to the invention with a 2% gas black content was produced from the gas black suspension according to the invention using ethanol, ethyleneglycol, 1,2 hexanediol and deionised water. For this purpose, the premix was introduced to the ink additives and the carbon black suspension carefully added while stirring.

The degree of dispersion was assessed using the light microscope.

Figure 2:
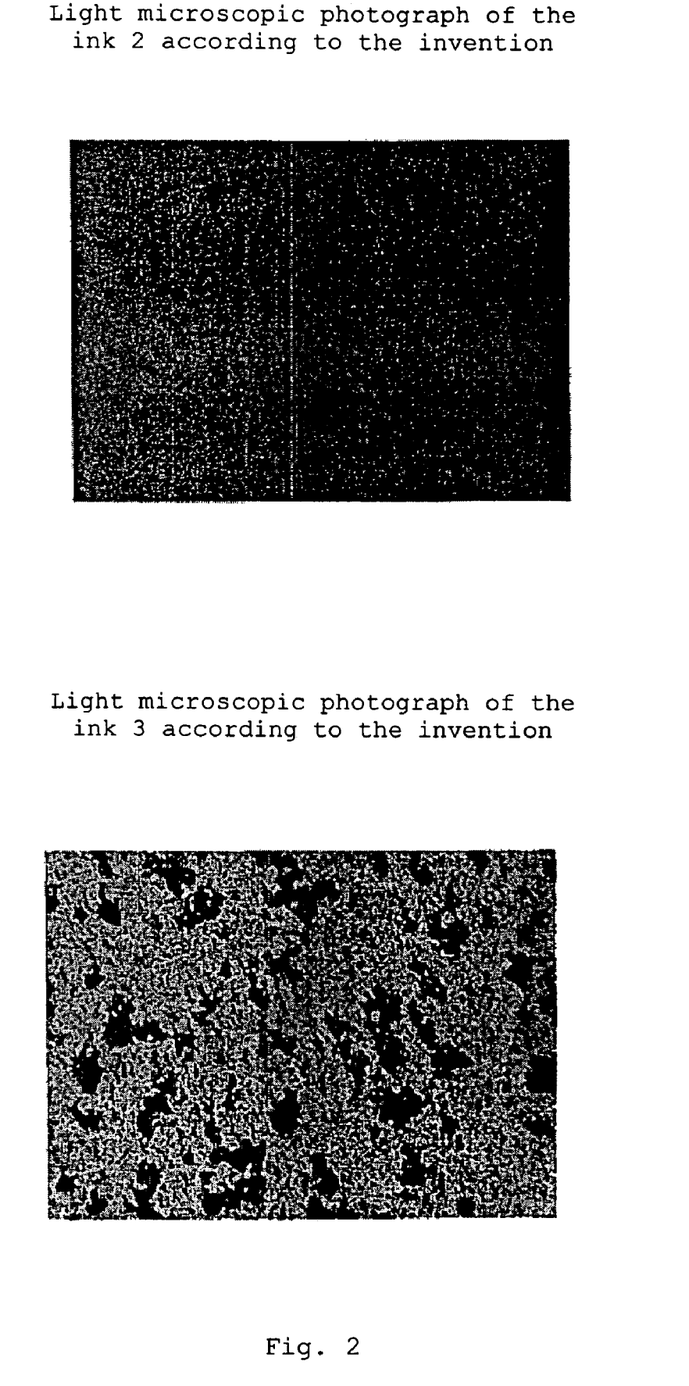
FIG. 2A is a light microscopic photograph of ink 2 of the invention.
FIG. 2B is a light microscopic photograph of ink 3 of the invention.
Figure 3:
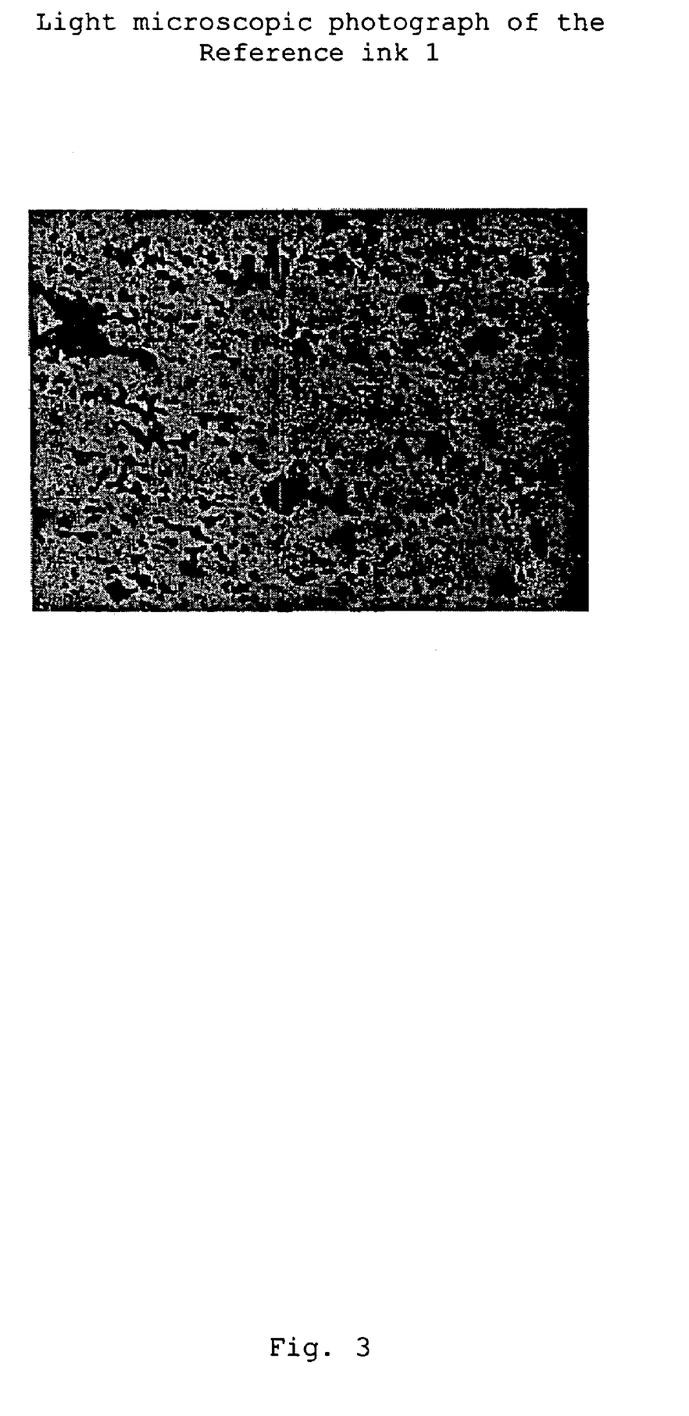
FIG. 3 is a light microscopic photograph of reference ink 1.

FIG. 2 shows light microscopic photographs of the inks 2 and 3 according to the invention and FIG. 3 shows light microscopic photographs of the reference ink 1. The reference ink 1 has a very large coarse fraction and is virtually completely flocculated, while the ink 3 according to the invention is partially flocculated and the ink 2 according to the invention is not flocculated at all. In particular, the ink 2 according to the invention has a high degree of dispersion and no coarse fractions.

The two inks according to the invention based on gas black produce very high optical densities on copier paper, while the reference ink with furnace carbon black produces substantially lower optical densities on copier paper.

The invention claimed is:

1. An aqueous, colloidal gas black suspension, comprising at least one gas black, an azo compound of formula 1, (1)

wherein $R^1$–$R^{18}$ may be identical or different and are members selected from the group consisting of hydrogen, hydrophilic or hydrophobic groups, acceptor or donor substituents or portions of aliphatic, aromatic or heteroaromatic, acyclic, cyclic or multiple cyclic systems with acceptor, donor, hydrophilic and hydrophobic groups,
and water.

2. The aqueous, colloidal gas black suspension according to claim 1, wherein the gas black has a volatile matter content (950° C.) of <21% by weight, a BET surface area of 80 to 350 m²/g, a primary particle size of 8 to 40 nm and a DBP number of 40 to 200 ml/100 g.

3. The aqueous, colloidal gas black suspension according to claim 1, wherein the gas black is present in an amount of <30% by weight.

4. An aqueous, colloidal gas black suspension according to claim 1, wherein the azo compound of formula 1 is present in an amount of <5% by weight.

5. An aqueous, colloidal gas black suspension according to claim 1, wherein the azo compound of formula 1 contains less than 30% by weight contamination.

6. The aqueous, colloidal gas black suspension according to claim 1, wherein the azo compound of formula 1 contains less than 10% by weight salt.

7. An aqueous, colloidal gas black suspension comprising at least one gas black, water and an azo compound which is a member selected from the group consisting of:
2-[[4-[(1-hydroxy-6-phenylamino-3-sulpho-naphthalen-2-yl)azo]-6-sulpho-naphthalen-1-yl]azo]-5-methyl-benzene-1,4-disulphonic acid,
5-[4-(4-(7-[[2-ethoxy-4-(4-methyl-2-sulpho-phenylazo)-6-sulpho-naphthalen-1-yl]azo]-8-hydroxy-3,6-disulpho-naphthalen-1-ylamino)-6-phenylsulphanyl-[1,3,5]triazin-2-ylamino]-phenylazo]-2-hydroxy-benzoic acid and
tetrasodium-6-amino-4-hydroxy-3-[[7-sulphonato-4-[(4-sulphonatophenyl)azo]-1-naphth-1-yl]azo]naphthalene-2,7-disulphonate and at least one of a biocide, a wetting agent or an additive, wherein the wetting agent is present from 0 to 1% by weight.

8. The aqueous, colloidal gas black suspension according to claim 7, wherein the azo compound contains less than 30% by weight contamination and less than 10% by weight salt.

9. The aqueous, colloidal gas black suspension according to claim 7, wherein the wetting agent is a member selected from the group consisting of fatty alcohol ethoxylate, polyacrylic acid, polyacrylic acid derivatives, copolymer containing acrylic acid, acrylic acid derivatives, styrenes, styrene derivatives, polyethers, lignin sulphonate, alkyl benzene sulphonate, naphthalene sulphonic acid derivative, copolymer containing maleic acid anhydride maleic acid derivatives and mixtures thereof.

10. The aqueous, colloidal gas black suspension according to claim 7, wherein the additive is an alcohol, glycol, glycol ether, heterocycle or glycerol.

11. The aqueous, colloidal gas black suspension according to claim 7, wherein the additive is present in an amount of <30% by weight.

12. The aqueous, colloidal gas black suspension according to claim 1, which is free from wetting agent, the azo compound of general formula I is between 0.1 and 1% by weight and where the aqueous, colloidal gas black suspension has a salt content of less than 2500 ppm.

13. The aqueous, colloidal gas black suspension according to claim 7, wherein the amount of the wetting agent is from 0 to 0.4% by weight.

14. The aqueous, colloidal gas black suspension according to claim 1, which further contains a wetting agent in the amount of up to 0.4% by weight relative to the total weight of the suspension.

15. A process for producing the aqueous, colloidal gas black suspension according to claim 7, comprising dispersing the gas black and the azo compound of formula 1 in water.

16. The process for producing the aqueous, colloidal gas black suspension according to claim 15, wherein the dispersing is carried out in a bead mill, ultrasound equipment, high-pressure homogenizer, microfluidiser, or high shear mixer.

17. A process for making a composition of matter comprising mixing the aqueous, colloidal gas black suspension according to claim 7 into inks, ink jet inks, paints, printing inks, latices, textiles, leather, adhesives, silicones, plastics materials, concrete or construction materials.

18. An ink composition comprising a vehicle and the aqueous, colloidal gas black suspension according to claim 7.

19. The ink according to claim 18, wherein the azo compound of formula 1 is between 0.01 and 0.5% by weight.

20. The ink according to claim 18, which is free from wetting agent, the azo compound is present in an amount of 0.01 to 0.5% by weight and the ink has a salt content of less than 250 ppm.

* * * * *